(12) United States Patent
Basso et al.

(10) Patent No.: US 8,949,856 B2
(45) Date of Patent: *Feb. 3, 2015

(54) MERGING RESULT FROM A PARSER IN A NETWORK PROCESSOR WITH RESULT FROM AN EXTERNAL COPROCESSOR

(71) Applicant: International Business Machines Corporation, Armonk, NY (US)

(72) Inventors: Claude Basso, Raleigh, NC (US); Jean L. Calvignac, Raleigh, NC (US); Chih-jen Chang, Apex, NC (US); Philippe Damon, Chapel Hill, NC (US); Natarajan Vaidhyanathan, Carrboro, NC (US); Fabrice J. Verplanken, LaGaude (FR); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/891,825

(22) Filed: May 10, 2013

(65) Prior Publication Data

US 2014/0337677 A1 Nov. 13, 2014

Related U.S. Application Data

(63) Continuation of application No. 13/365,778, filed on Feb. 3, 2012, now Pat. No. 8,468,546.

(30) Foreign Application Priority Data

Feb. 7, 2011 (EP) .................................... 11305120

(51) Int. Cl.
*G06F 3/00* (2006.01)
*G06F 9/54* (2006.01)

(52) U.S. Cl.
CPC .................................... *G06F 9/546* (2013.01)
USPC ........................................................ 719/314

(58) Field of Classification Search
CPC ...................................................... G06F 9/546
See application file for complete search history.

(56) References Cited

U.S. PATENT DOCUMENTS 6,754,223 B1 6/2004 Lussier et al.
7,174,394 B1 2/2007 Garner et al.

(Continued)

OTHER PUBLICATIONS

William J. Dally, Architecture of Message-Driven Processor, 1987.*

(Continued)

*Primary Examiner* — Lechi Truong
(74) *Attorney, Agent, or Firm* — Stephen R. Tkacs; Stephen J. Walder, Jr.; Steven L. Bennett

(57) ABSTRACT

A mechanism is provided for merging in a network processor results from a parser and results from an external coprocessor providing processing support requested by said parser. The mechanism enqueues in a result queue both parser results needing to be merged with a coprocessor result and parser results which have no need to be merged with a coprocessor result. An additional queue is used to enqueue the addresses of the result queue where the parser results are stored. The result from the coprocessor is received in a simple response register. The coprocessor result is read by the result queue management logic from the response register and merged to the corresponding incomplete parser result read in the result queue at the address enqueued in the additional queue.

18 Claims, 5 Drawing Sheets

(56) References Cited

U.S. PATENT DOCUMENTS

| | | |
|---|---|---|
| 7,272,675 B1 | 9/2007 | Paul et al. |
| 7,428,618 B2 | 9/2008 | Najam et al. |
| 8,065,503 B2 | 11/2011 | Jia |
| 8,250,308 B2 | 8/2012 | Papazova et al. |
| 2003/0041172 A1 | 2/2003 | Calvignac et al. |
| 2006/0174058 A1 | 8/2006 | Sikdar et al. |
| 2008/0091649 A1 | 4/2008 | Lim et al. |
| 2009/0019225 A1 | 1/2009 | Maeda |
| 2012/0204002 A1 | 8/2012 | Basso et al. |
| 2012/0204190 A1 | 8/2012 | Basso et al. |

OTHER PUBLICATIONS

Notice of Allowance mailed Feb. 14, 2013 for U.S. Appl. No. 13/365,778; 16 pages.

U.S. Appl. No. 13/365,679.

U.S. Appl. No. 13/365,778.

Albrecht, C et al., "Performance Analysis of Bus-Based Interconnects for a Run-Time Reconfigurable Co-Processor Platform", 16th Euromicro Conference on Parallel, Distributed and Network-Based Processing, 2008, PDP 2008, Issue Date: Feb. 13-15, 2008, pp. 200-205.

Bux, Werner et al., "Technologies and Buildling Blocks for Fast Packet Forwarding", IEEE Communications Magazine, Jan. 2001, pp. 70-77.

Carr, Dave et al., "Co-Processors Help Meet Packet Processing Challenges", Lightwave, Feb. 28, 2005, 3 pages.

Kachris, C, "Analysis of a Reconfigurable Network Processor", 20th International Parallel and Distributed Processing Symposium, 2006, IPDPS 2006, Issue Date: Apr. 25-29, 2006, 8 pages.

Ohlendorf, Rainer et al., "Chapter 17, Flexpath NP—Flexible, Dynamically Reconfigurable Processing Paths in Network Processors", Dynamically Reconfigurable Systems, DOI 10.1007/978-90-481-3485-4_17, Springer Science +Business Media B.V., 2010, 2 pages.

Rajkamal, R et al., "Packet Classification for Network Processors in WSN Traffic Using Ann", 6th IEEE International Conference on Industrial Informatics, 2008, INDIN 2008. Issue Date: Jul. 13-16, 2008, pp. 707-710.

Reibman, Andrew L., "Modeling the Effect of Reliability on Performance", IEEE Transaction on Reliability, vol. 39, No. 3, Aug. 1990, pp. 314-320.

* cited by examiner

MERGING RESULT FROM A PARSER IN A NETWORK PROCESSOR WITH RESULT FROM AN EXTERNAL COPROCESSOR

BACKGROUND

This invention generally relates to network processing; more particularly, the invention aims at providing a connection of a network processor packet parser to an external coprocessor for efficiently merging parser and external coprocessor results.

High performance network processors on one chip may have to handle sophisticated network functions. Particularly, a packet parser, for instance in an Ethernet adapter, may have to support high level packet classification and packet filtering functions which cannot be all handled on a chip. In these circumstances, the parser will have to kick-off some packet processing functions to an external coprocessor and get in return the response from the coprocessor in order to use this result as a complement to its own packet process result.

It is common to decide for externalizing network processing functions from the packet parser because different functions may require different processing architecture and performance, the network processor chip being not able to include all these characteristics. The other good reason is an area limitation problem on the chip as packet parsing additional network function may require logic and arrays which may be very large.

A typical additional network processing function which may be externalized by the packet parser to the coprocessor is packet classification including, as an example, a lookup in a ternary content addressable memory (TCAM) or a hash-based lookup for which different search algorithm are employed (Patricia tree, Cuckoo algorithm etc.). One other function which can be externalized by the packet parser to the coprocessor is the packet filtering functions which are based on recognition of patterns extracted from the packet.

Merging in the network processor of results from parser and results coming from the external coprocessor when processing data packets received from the network by the network processor will require two functions: synchronization of the results between the two processing entities (parser and coprocessor) and error handling in case of lost or corrupted results which may come for instance from a failure of synchronization. With 10 Gpbs Ethernet ports, it is necessary to merge the results in the network processor as quickly as every 67.2 ns as shortest Ethernet packets are received every 67.2 ns. A second strong constraint of the implementation is to limit the silicon area: merging process requires traditionally additional first-in-first-out queues (FIFOs) which represent costly memory array (static random access memories (SRAMs) for instance). Synchronization requires, with standard solutions, feedback logic to control reception of results from the external coprocessor. Error handling function includes costly additional data exchange in the Network processor and external coprocessor interface while remaining reasonable. Finally, this process of merging results must be compatible with cases where there is no need of result merging, when the parser processes the data packet itself without having sent a request to the external coprocessor for additional processing.

Due to the use of high-speed serialized lines between the network processor and the external coprocessor, which is the best way to save lines and pins, this solution is more sensitive to errors than the slow speed parallel lines. There is thus a need when implementing such a merging function to have a careful error handling while not too costly in terms of silicon area.

The U.S. Pat. No. 7,428,618 relates to a network node structure architected around two Net Processors, one for each direction of packet streams, communicating through a shared memory. The structure is complemented with a set of coprocessors located on a daughter card. All coprocessors are interconnected via a hardware Control Logic which also provides an interface to one of the two Net Processors, via a dedicated memory. In this prior art document, there is no description of a re-synchronization function for merging the result of the coprocessor with the result of another process run by a main processor: the operation is rather a classical coprocessor mechanism whereby the Net processor waits for the result of the request sent to the coprocessor.

There is thus a need to provide a reliable solution to merge results from parser when the network processor receives packets from the network with results from an external coprocessor to which the parser may have sent a request when parsing a data packet.

It is noted that the embodiments of the invention as described above can apply to any type of external coprocessor such as a processor, an application specific integrated circuit (ASIC) or a field programmable gate array (FPGA) coprocessor.

SUMMARY

It is an object of the present invention to provide a method and system for extending a parser main path in a network processor implemented for instance on one chip for merging the result from an external coprocessor with the result of the parser when the parser has sent a request for additional processing to the external coprocessor.

In one illustrative embodiment, a method is provided for managing in a network processor results from a parser analyzing an incoming data packet, said parser result management method may comprises a merging operation between results from the parser and result from an external coprocessor to which the parser has asked for additional processing. The method comprises enqueueing in a result queue a result coming from the parser in which is indicated if the parser result is complete or needs to be completed by a coprocessor result. The method further comprises enqueuing in an additional queue an entry containing the address of the entry in the result queue and the indication that the parser result is complete or needs to be completed. The method further comprises waiting for arrival of a response from the coprocessor in a response register. The method further comprises upon reception of a response from the coprocessor, reading that the additional queue first entry refers to a parser result to be completed, merging the result from the coprocessor response with the parser result read in the result queue, writing the completed result in the result queue and exposing the merged results to a dequeue and sequential sending process for further processing by the network processor. The method further comprises reading that the additional queue first entry refers to a complete parser result and exposing the corresponding result queue entry to a dequeue and sequential sending process for further processing by the network processor. The method further comprises repeating the above operation until the additional queue is empty.

In another illustrative embodiment, a computer program product comprises programming code instructions for executing the operations of the method when the program is executed on a computer.

In another illustrative embodiment, a system is adapted for carrying out the method.

DETAILED DESCRIPTION

Figure 1:
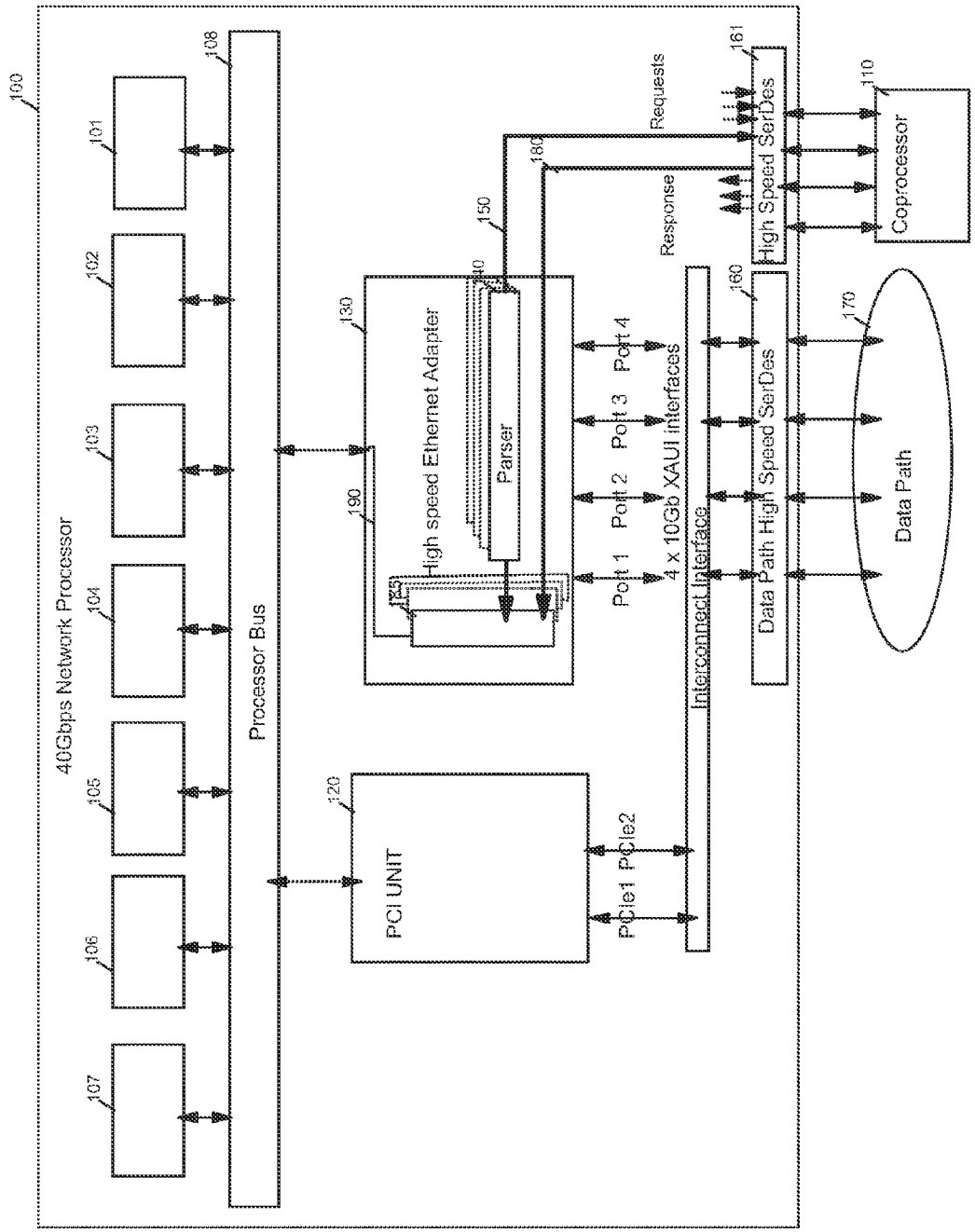
FIG. 1 is a global view of a network processor in which aspects of the illustrative embodiment are implemented with its per port parser function and parser connection to an external coprocessor.

FIG. 1 is a global view of a network processor in which aspects of the illustrative embodiment are implemented with its per port parser function and parser connection to an external coprocessor. FIG. 1 is a global view of an illustrative 40 Gbps network processor (100) which exchanges data with a computer not represented here, if top-down described, implements processing functions with specialized processors (101 to 107) connected to an internal processor bus (108). Two illustrative main network protocols are supported by this network processor, by a peripheral component interconnect (PCI) unit (120) connected to the internal bus (108) and supporting outside connections, for instance to a universal serial bus (USB) port and by an Ethernet adapter (130) supporting 4×10 Gbps IEEE standardized 10 GB sixteen-bit interface (XSBI) attachment unit interface (XAUI) interfaces (Port 1, Port 2, Port 3 and Port 4) which represents the Ethernet packet data path. The PCI and Ethernet data traffic are merged through an Interconnect Interface to the four Ethernet ports (Port 1, Port 2, Port 3 and Port 4). The PCI and Ethernet data traffic is then serialized (top-down traffic) in a High Speed serializer/deserializer (SerDes) (160), the resulting high speed data path (170) comprising 4 serialized lanes of 4×2 for transmit and received as it is bidirectional.

The high speed Ethernet adapter (130) receives packets of data path (170) from high speed links deserialized in a high speed serdes (serializer/deserializer) (160) through the standard XAUI interface on four Ethernet ports. On each Ethernet port, each Ethernet packet received is analyzed by the use of a parser (140) the per port parser result being managed by logic (185) which receives the parser result and sends this result (190) for further processing into the network processor (101-107).

At any time during a packet parsing window, a parser may need to externalize a parsing function to an external coprocessor; note that the request to the external processor is not mandatory, the parser may not externalize packet processing for all data packets. The coprocessor is qualified as 'external' to the network processor (100) which is implemented in one chip. It is noted that 4 inputs are represented on the coprocessor but the number of inputs on an external coprocessor is variable. The parser triggers 'request' message encoding, serializing and transmission to the coprocessor (110). In its bottom-up path, the parser deserializes and decodes the 'response' message received from the coprocessor, and it merges this result with the result of its own packet process. The requests are sent on a connection link (150) to the external coprocessor which sends a response containing the coprocessor result on a connection link (180) to the per port parser result management which will have to merge the result from the parser with the result from the coprocessor for a same packet.

Note that in the example where the coprocessor is an FPGA with four inputs, each input can be assigned to externalization of one per port parser so that for each Ethernet port packet processing one 4-tuple is assigned comprising: (parser (140), link to send request (150), link to receive response (180) and logic for managing parser result (185)).

As it will be described in more detail in reference to description of FIG. 2, the new per port parser result management logic (185) is an extension of a simpler per port parser result management logic when no external coprocessor is used: if there is no external coprocessor, the per port parser result management logic only collects each result from the parser, enqueues it in a result FIFO and a Dequeue and sequential Sending process sends it for further processing to the network processor. The new per port parser result management logic (185) includes additional logic for merging result from per port parser and result from coprocessor used each time the per port parser has externalized some processing to the external coprocessor. It is noted that the links and high speed Serdes (161) for connecting the parser to the external coprocessor are just represented for comprehension, their implementation are not the object of the present description.

Figure 2:
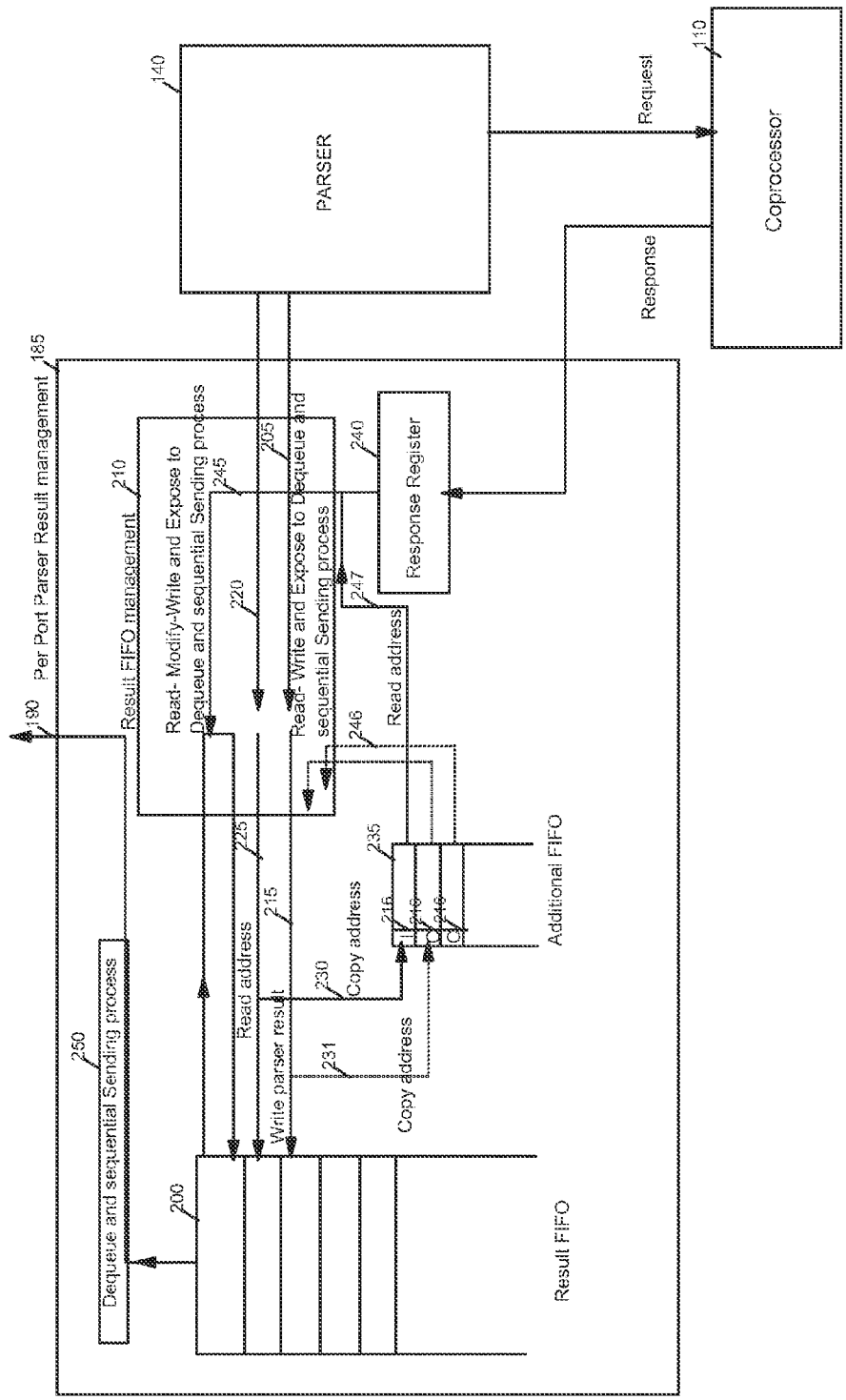
FIG. 2 illustrates the logic components of a per port parser result management extended to merge result from the parser and from an external coprocessor according an illustrative embodiment.

FIG. 2 illustrates the logic components of a per port parser result management extended for merging results from the parser and from an external coprocessor according to the solution of the preferred embodiment. When the parser does not use an external coprocessor, it sends results after data packet processing (205) and the Result FIFO management (210) component writes (215) the parser result in a FIFO (200) which could be an SRAM. As well known in the art, the logic for FIFO management reads the FIFO and sends the read result on a link (190) for further processing in the other components of the network processor.

The parser (140) is extended by logic for sending requests to an external coprocessor (110); in the case where the parser has sent a request, when the parser processing is complete it sends to the extended Result FIFO management an incomplete result (220) and which needs to be completed by merging this result with the result coming from the coprocessor response. The incomplete parser result is enqueued (225) in the Result FIFO (200) as it is the case with the complete results when the parser has not sent a request to the coprocessor.

The per port parser result management logic copies (230) the FIFO pointer of the result FIFO where the incomplete result is enqueued and enqueues it in an additional FIFO (235). It is noted that a C/I bit is added in the entries of the result FIFO and additional FIFO as explained in more detail later on in the document at the end of description of FIG. 2. The coprocessor (110) sends a response to the per port result management component when the computing operation is completed operation in the coprocessor is complete. The response is stored in a simple register, the response register (240), and this triggers reading of the additional FIFO and a "Read-Modify-write & Expose to Dequeue and sequential Sending" (245) operation to complete the incomplete result enqueued in the Result FIFO with the result of the coprocessor response read in the additional FIFO and send to be ready to be dequeued by the Dequeue and sequential Sending process logic (250).

The Dequeue and sequential Sending process logic is a standard logic well known from prior art which dequeues sequentially the entries enqueued in the result FIFO. It is assumed that the merging operation consisting in completing an incomplete parser result with the result of the coprocessor implies a defined operation which could be a switch logic. For instance, the merging operation could be bit-wise multiplex implemented and a formatting of the multiplexors could be conveyed in the response from the coprocessor and applied for defining the merging operation.

It is noted that the parser result which has no need to be completed and a parser result which has been completed are dequeued from the Result FIFO by the same logic to send parser result.

A usual way to merge the two asynchronous flows would have been to use two additional FIFOs one for storing incomplete parser results and one for storing incoming coprocessor results. In a same usual way logic is used to read parser results into a result FIFO and to dequeue and send parser results. In the illustrative embodiment, the logic to read parser result is extended to merge the result from parser and from coprocessor (Read-Modify-Write), the same logic being used to dequeue and send final parser results and only one additional FIFO and one simple register are added. With the solution of the preferred embodiment some silicon area is definitely saved.

It is noted also that the time to merge parser and coprocessor results should be limited and under the time allocated to the parser to process one incoming data packet on the receiving line. For instance, the shortest Ethernet packets arriving on 10 Gbps Ethernet lines must be processed not more than every 67.2 ns. The Read-Modify-Write operation costs 3 clock cycles which takes 3×1.6 ns=4.8 ns. The reception of response (120 bits for the response field as detailed in reference to the description of FIG. 6) takes:

For a link of 3.125 Gbps, 0.32 ns×120 bits=38.4 ns; and
For a link of 12 Gbps, 0.125 ns×120 bits=15 ns.

At any speed, time to receive a response from the coprocessor takes much longer (>15 ns) than time to perform the Read-Modify-Write operation (4.8 ns). It is noted that the 67.2 ns shortest inter data packet time is defined by the IEEE standard. The computing for evaluating the time for read-modify-write operation for the operation of merging the parser and coprocessor results and enqueuing in a result FIFO is based on one example embodiment (120 bits for the response field).

The preceding part of description of FIG. 2 explains the general principle of parser result management, new information needs to be added and managed for respecting the good sequence of the parser results which must be sent to the upper layer of the network processor in the same sequence as the sequence of arrival of incoming data packets. For this reason a 'complete' (C) or 'incomplete' (I) bit (216) is set by the parser when computing a result for enqueuing in the result FIFO. This bit is copied in the corresponding entry of the additional FIFO containing the address of the parser result in the result FIFO. By the way, after an entry is created in the result FIFO with an incomplete parser result, when the following parser results received from the parser even if they are complete, a corresponding entry is enqueued (231) in the additional FIFO. These entries will include for the complete parser result, the C/I set to C.

When a response is received from the coprocessor, the first entry of the additional FIFO (C/I bit set to I) is read (read means dequeued for a FIFO) and the corresponding parser result to be completed which is enqueued in the result FIFO is completed by the Result FIFO management (210) with the result read in the response register (Read-Modify-Write) then, the completed parser result is exposed to the Dequeue and sequential Sending process (250). Furthermore, all the entries having the complete bit (C/I set to C) in the additional FIFO are processed in a similar way (246) except that the 'Read-Modify-Write and expose to Dequeue and sequential Sending process' (245) is limited to 'Read-Write and Expose to Dequeue and sequential Sending process' there is no modification of the entry read in the result FIFO. In this way the sequential processing and sending of parser results is insured, this sequential order respecting the same sequential order of packet reception.

It is noted that in the entries enqueued in the result FIFO which correspond to either 'incomplete' and the following one which are 'complete', are stored in one area of the FIFO which is not exposed to the Dequeue and sequential Sending process (250). When the result entries are exposed they are written in one other area of the result FIFO which can be exposed to the Dequeue and sequential Sending process (250). As a consequence, the processing of a parser result always comprises: Read the address in the additional FIFO (246 or 247 depending if this dequeuing is for a complete or incomplete parser result) and Read the entry corresponding to the read address in the result FIFO (this entry is located in the area of the result FIFO which cannot be exposed to the Dequeue and sequential Sending process).

In the first case where the corresponding parser result is incomplete (bit set to I in the additional FIFO entry), the parser result read in the result FIFO is then modified (merging with the coprocessor result in the response register (240)) and written in one area of the result FIFO which can be exposed to the Dequeue and sequential Sending process, then it is really exposed to the Dequeue and sequential Sending process. In the second case where the corresponding parser result is complete (bit set to C in the additional FIFO entry), the parser result read in the result FIFO is not modified and it is written in one area of the result FIFO which can be exposed to the Dequeue and sequential Sending process, then it is really exposed to the Dequeue and sequential Sending process. This is why for the first case of processing an incomplete result the Result FIFO management logic performs a 'Read-Modify-Write and expose to Dequeue and sequential Sending process' (245), as for the second case of processing an complete result the Result FIFO management logic performs a 'Read-Write and expose to Dequeue and sequential Sending process' (246).

Figure 3:
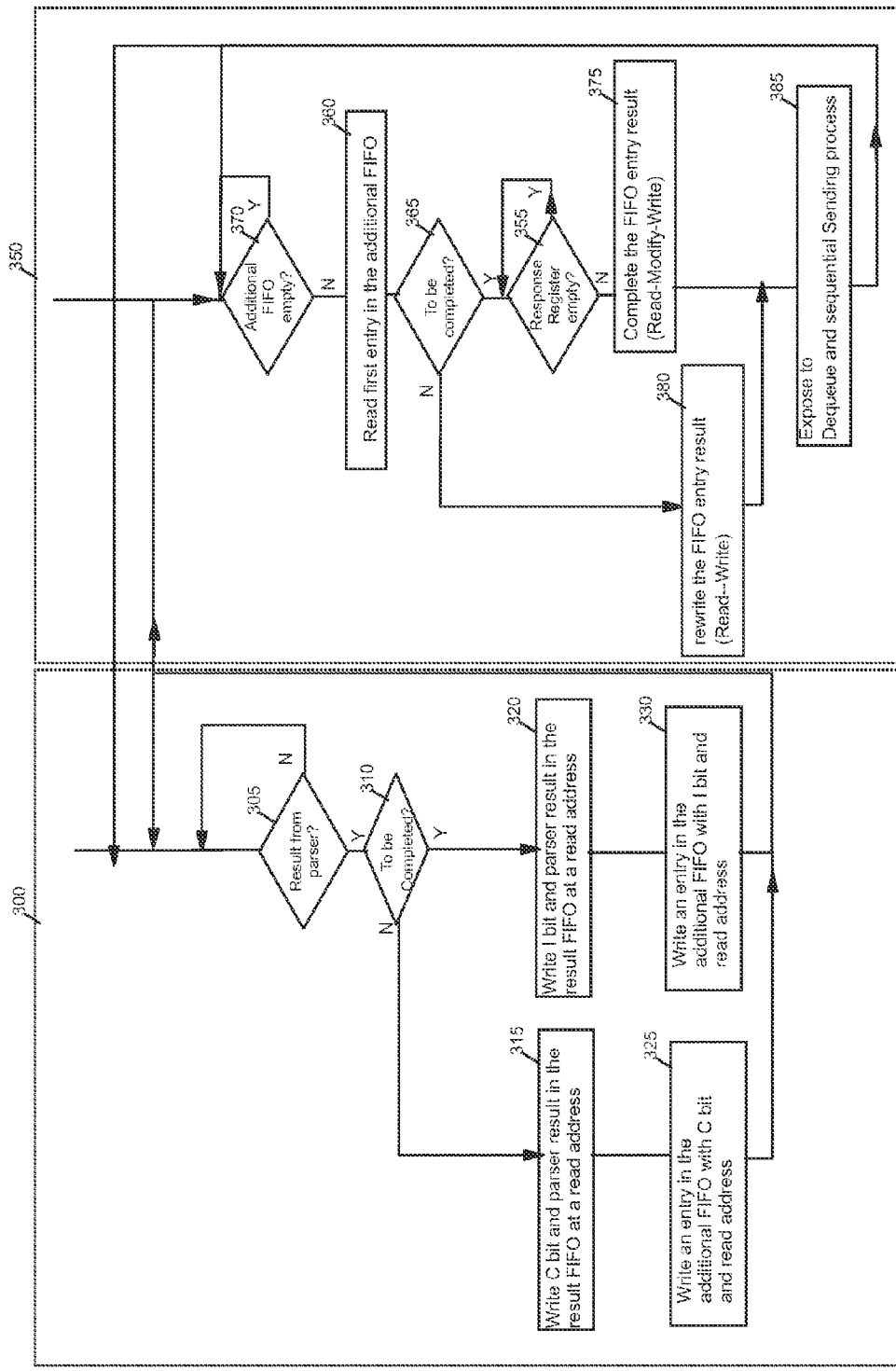
FIG. 3 is a flowchart illustrating the operation of managing parser results of one network port, including merging results from parser and coprocessor in accordance with an illustrative embodiment.

FIG. 3 is a flowchart illustrating operation of managing parser results of one network port, including merging results from parser and coprocessor in accordance with an illustrative embodiment.

The flowchart is characterized by two processes running asynchronously:

a first process (300) triggered by parser result arrival for enqueueing of parser result in a result FIFO and enqueuing of its result FIFO address in an additional FIFO, a second process (350) triggered by arrival of a response of the coprocessor, for merging an incomplete parser result enqueued in the result FIFO with the result from the coprocessor and exposing the final parser result and all the following final parser results having no need to be completed to the dequeue and send process towards the other process of the network processor.

These two processes are asynchronous and the final results sent by the per port result management logic (185) respect the period of arrival of parser results (67.2 ns corresponding to period between two received data packets) which is much larger than time for merging results from parser and coprocessor (4.8 ns). Furthermore, the two step enqueuing of parser results respects the sequence of data packet parser results.

The method of FIG. 3 may be implemented as logic (185) in a network adapter for each network port.

In the first process 300, the first step consists in waiting for a result from the parser (answer no to test 305) which arrives each 67.2 ns or more. When the parser has processed the data packet it sends a result (answer yes to test 305) assigning for instance a I (for incomplete result) or C bit (for complete result); the parser assigns a I bit if the parser has sent during data packet processing a request for additional processing to the external coprocessor and a result from the coprocessor needs to be merged with the parser result. If the parser result C/I bit is set to I (answer yes to test 310), the I bit and the parser result are written (320) in one entry of a FIFO storing parser results, the result FIFO. Then the I bit and the address of the just written entry of the result FIFO is copied in an additional FIFO (330).

If the parser result C/I bit is set to C (answer no to test 310), the parser result is written (315) in one entry of a FIFO storing parser results, the result FIFO. It is noted that the parser results are stored in an area of the result FIFO which cannot be exposed to the Dequeue and sequential sending process (250). The I bit and the address of the just written entry of the result FIFO are copied in the additional FIFO (325). Then, the process waits for either an arrival of a result of the parser (305) and performs a loop on the preceding steps determines whether the additional FIFO is empty (answer yes to test 370).

If the additional FIFO is not empty (answer no to test 370), the first entry in the additional FIFO is read (360) if the C/I bit is set to I (answer yes to test 365) this means the parser result stored at the address read in the first entry of the additional FIFO is to be completed. The process waits (answer yes to test 355) until a response is received from the coprocessor and the response register is not empty (answer no to tests 355).

When the response register is no longer empty, the entry in the result FIFO pointed by the address in the additional FIFO is read and merged with the result of the coprocessor read in the response received. The final result is enqueued in the result FIFO (375) in an area of the FIFO known from the Dequeue and sequential sending process (250) and this result is then exposed to this process (385). If the first entry in the additional FIFO is for a complete result (bit C/I set to C, answer no to test 365), the complete result is read from the result FIFO at the address read in the additional FIFO and it is enqueued in the result FIFO (380) in an area of the FIFO known from the Dequeue and sequential sending process (250) and this result is then exposed to this process (385). The process to dequeue the entries from a FIFO queue and sequentially sent is well known in the art. When processed the result entries are further processed in the upper layers of the network processor.

Figure 4:
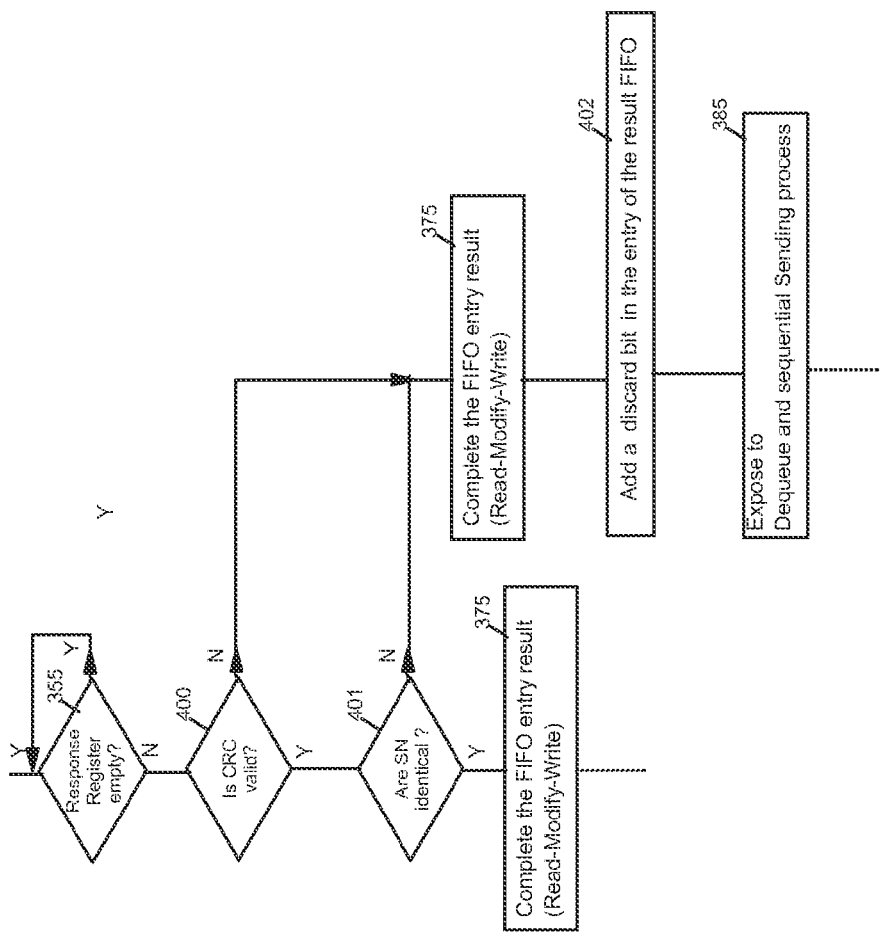
FIG. 4 is a flowchart illustrating the operation of merging result from parser and an external coprocessor including error handling according to an illustrative embodiment.

FIG. 4 is a flowchart illustrating operation of merging result from parser and an external coprocessor including error handling according to an illustrative embodiment.

High-speed serialized lines is the less costly way today to support traffic in network processors and external coprocessors; however, the risk of errors with serialized lines is higher than with more numerous slow-speed parallel lines. The implementation of merging in the network processor the results coming from the per-port parsers and the results coming from the external coprocessor when the parsers have sent requests will include a reliable error handling function. The principle applied for error handling in the preferred embodiment is to discard a packet by forcing a 'discard packet' bit of the parser result to I if a response from the coprocessor was lost or corrupted or de-sequenced. The discard bit is further processed in the upper layers of the network processor for instance for discarding the corresponding data packet.

More particularly, it is assumed that, for each data packet received, the parser optionally may send a unique request to the external coprocessor performs in parallel its own processing and sends one parser result for being enqueued in the result FIFO. If a request has been sent, the parser includes a sequence number in the request, for instance a 7 bit sequence number field, and includes this same sequence number in the parser result to be enqueued in the result FIFO. Furthermore, the same sequence number is added to the pointer address and enqueued in the additional FIFO. During processing in the coprocessor, the same sequence number read from the request is included in the bit field forming the response of the coprocessor. A second assumption is that the coprocessor is in charge of keeping the same sequencing of the received requests when the corresponding response is sent by the coprocessor to the network processor.

The merge function is performed in the network processor only if the sequence number read in the response register and in the first entry of the additional FIFO is the same parser result. If the sequence number is different (answer no to test 401), the additional FIFO entry is discarded and the discard bit is set to 1 in the result FIFO (402). The upper layers of the network processor may discard the data packet corresponding to this parser result.

The error handling process also takes care of the case where a response received from the coprocessor is corrupted. A CRC bit field (or any other type of bit field validity checking) is set in the response built by the coprocessor and checked that it is valid (400) when read from the response register. This CRC validity test is performed before checking of sequence number at reception of the response. If the CRC is invalid, the response is canceled from the response register and will be considered as 'missing' by the rest of the merging function. As the response is missing the same process is applied (375, 402, 385 . . . ) as described above when a response is lost.

The fact that the process, in case of a result sent by the coprocessor to the network processor is corrupted, reuses the process put in place in case no such result is received allows, as described hereunder in more detail, reuse of the same logic; as a consequence some silicon area is saved, this is particularly beneficial to the network processor implementation.

Figure 5:
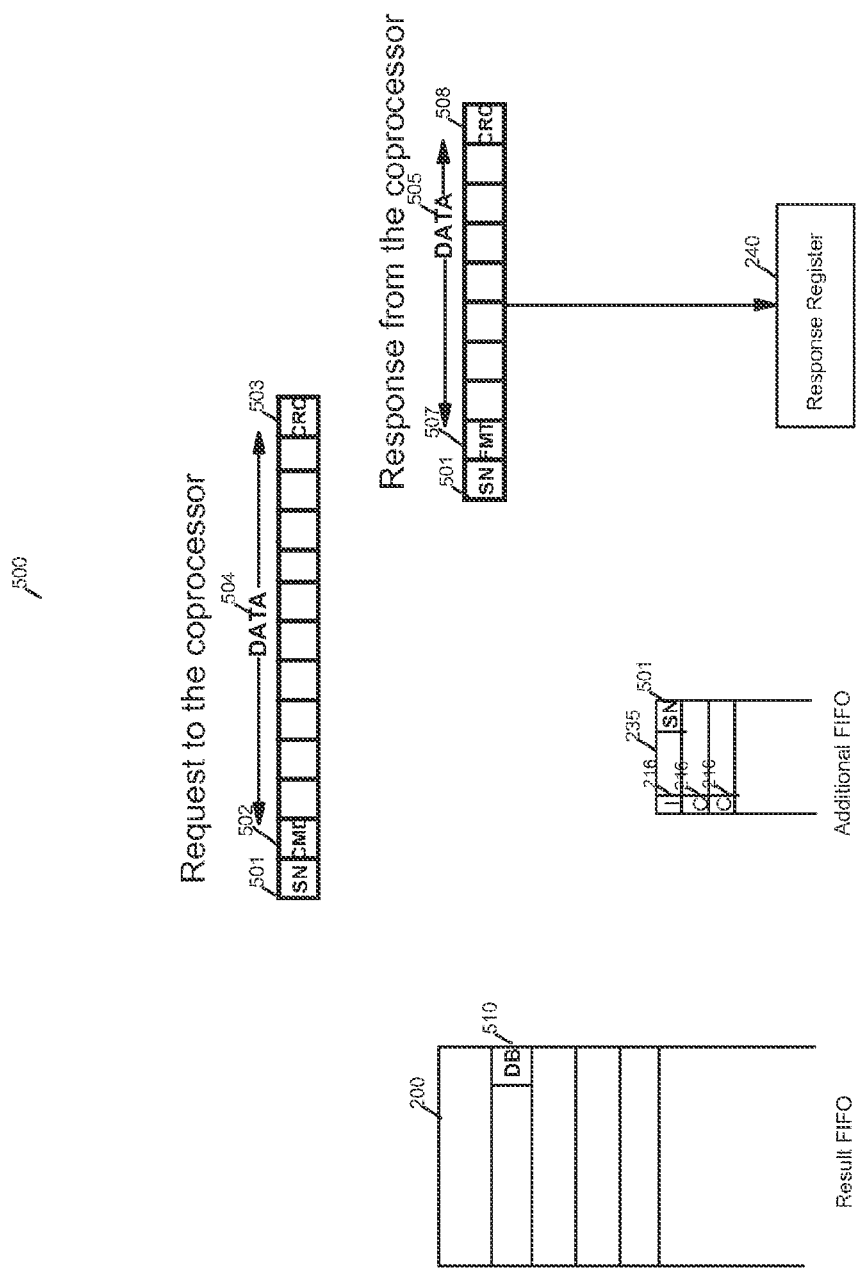
FIG. 5 illustrates a coprocessor response bit field used according to an illustrative embodiment.

FIG. 5 illustrates a coprocessor request and response bit field used according to the preferred embodiment of the invention.

The bit field request from the parser to the external coprocessor comprises a command (502) and a data (504) bit field. It includes also a sequence number (501) which corresponds to the data packet sequence that the parser analyzes and for which the parser needs an additional process to be performed by the external coprocessor.

The coprocessor in the response it sends to the network processor includes data (505) and re-sends the same sequence number (501) received in the request.

As stated in reference to the flowchart of FIG. 4, if a request has been sent, the parser includes a sequence number in the request, for instance a 7 bit sequence number field, and includes this same sequence number in the parser result to be enqueued in the result FIFO (501). Furthermore, the same sequence number is added to the pointer address and enqueued in the additional FIFO (501).

A CRC allowing to check validity of the response bit field when it is received in the network processor is computed and added (508) in the response of the coprocessor. As a result and according to the flowchart described in FIG. 4, if the CRC included in the response from the coprocessor is not valid, a discard bit (510) is included in the corresponding entry in the result FIFO.

As described in FIG. 4 these sequence number (501) and CRC (508) fields are used to handle errors in the process of managing the per port parser results which may be built by merging the parser result with result from an external coprocessor.

The CRC bit field (503) in the request sent to the external coprocessor is used for checking bit field validity in the path from the parser to the external coprocessor. If the coprocessor detects a CRC (503) error, no response is sent back to the network processor and the error handling system of the Per-Port Parser Result management system is activated.

It is noted, the merging operation consisting in completing an incomplete parser result with the result of the coprocessor uses a predefined operation which could be switch logic. In the preferred embodiment the merging operation is not unique but configurable. The merging function may be bit-wise multiplex implemented and a formatting of the multiplexors could be conveyed in the response from the coprocessor and applied for defining the merging operation. By setting the format bit field (507) at a certain predefined value, the coprocessor provides a format indicating the type of merging that will be done in the Result FIFO management logic which performs the 'Modify' when merging the results from the parser and the result from the coprocessor. The format bit field (507) defines a configuration of the multiplexor forming the bit-wise multiplex implemented merging function.

The illustrative embodiment saves silicon area by avoiding implementing a feedback logic in the network processor to be applied to the link between the coprocessor and the network processor for receiving the results from the coprocessor. Also only one FIFO, one register and limited logic are added to the FIFO used by the parser to expedite the parsing result to the other components of the network processor. Finally, the error handling mechanism is simple as the same mechanism is used for missing results or corrupted data received from the coprocessor.

The invention claimed is:

1. A method for managing in a network processor results from a parser analyzing an incoming data packet, the method comprising:
    enqueueing in a result queue a parser result coming from the parser, wherein the parser result indicates whether the parser result is complete or needs to be completed by a coprocessor result from the external coprocessor, wherein the network processor comprises a processor bus, at least one processor connected to the processor bus, and a network adapter connected to the processor bus and the external coprocessor;
    enqueuing in an additional queue an entry containing an address of the entry in the result queue and the indication that the parser result is complete or needs to be completed;
    determining whether a first entry in the additional queue refers to a parser result to be completed; and
    responsive to determining the first entry in the additional queue refers to a parser result to be completed, responsive to receiving a coprocessor result in a response register,
    merging the coprocessor result from the response register with a parser result read from the result queue using the address from the first entry in the additional queue to form a completed result, writing the completed result in the result queue, and
    exposing the completed result to a dequeue and sequential sending process for further processing by the network processor.

2. The method of claim 1 further comprising:
    testing whether a cyclical redundancy check (CRC) included in the coprocessor result is valid; and
    responsive to the CRC not being valid, indicating in the corresponding entry in the result queue for upper layers of the network processor to discard the result.

3. The method of claim 2 wherein the indicating in the corresponding entry in the result queue for upper layers of the network processor to discard the result comprises setting a discard bit of the entry.

4. The method of claim 1, further comprising:
    adding to the additional queue entry a sequence number;
    determining whether a response sequence number included in the coprocessor response is identical to a sequence number stored in the first entry of the additional queue; and
    responsive to determining the response sequence number is not identical to the sequence number stored in the first entry of the additional queue, indicating in the corresponding entry in the result queue for the upper layers of the network processor to discard the result.

5. The method of claim 4 wherein indicating in the result queue entry for the upper layers of the network processor to discard the result comprises setting a discard bit of the entry.

6. The method of any one of claim 1, wherein merging the coprocessor result with the parser result comprises reading in the coprocessor response a configuration to be applied to the merge operation and applying the configuration to multiplexors forming a bit-wise multiplex implemented merging logic.

7. A network processor comprising:
    a processor bus;
    at least one processor connected to the processor bus; and
    a network adapter connected to the processor bus and an external coprocessor, wherein the network adapter comprises a result queue, an additional queue, a response register, a parser, and result queue management logic,
    wherein the result queue management logic enqueues in the result queue a parser result coming from the parser, wherein the parser result indicates whether the parser result is complete or needs to be completed by a coprocessor result from the external coprocessor;
    wherein result queue management logic enqueues in the additional queue an entry containing an address of the entry in the result queue and the indication that the parser result is complete or needs to be completed;
    wherein the result queue management logic determines whether a first entry in the additional queue refers to a parser result to be completed; and
    wherein responsive to determining the first entry in the additional queue refers to a parser result to be completed and responsive to receiving a coprocessor result in a response register, the result queue management logic merges the coprocessor result from the response register with a parser result read from the result queue using the address from the first entry in the additional queue to form a completed result, writes the completed result in the result queue, and exposes the completed result to a dequeue and sequential sending process for further processing by the network processor.

8. The network processor of claim 7, wherein the result queue management logic tests whether a cyclical redundancy check (CRC) included in the coprocessor result is valid; and
wherein responsive to the CRC not being valid, the result queue management logic indicates in the corresponding entry in the result queue for upper layers of the network processor to discard the result.

9. The network processor of claim 8 wherein the indicating in the corresponding entry in the result queue for upper layers of the network processor to discard the result comprises setting a discard bit of the entry.

10. The network processor of claim 7, wherein the network adapter adds to the additional queue entry a sequence number;
wherein the result queue management logic determines whether a response sequence number included in the coprocessor response is identical to a sequence number stored in the first entry of the additional queue; and
wherein responsive to determining the response sequence number is not identical to the sequence number stored in the first entry of the additional queue, the result queue management logic indicates in the corresponding entry in the result queue for the upper layers of the network processor to discard the result.

11. The network processor of claim 10, wherein indicating in the result queue entry for the upper layers of the network processor to discard the result comprises setting a discard bit of the entry.

12. The network processor of claim 7, wherein merging the coprocessor result with the parser result comprises reading in the coprocessor response a configuration to be applied to the merge operation and applying the configuration to multiplexors forming a bit-wise multiplex implemented merging logic.

13. A computer program product comprising a non-transitory computer readable storage medium having a computer readable program stored therein, wherein the computer readable program, when executed on a network adapter in a network processor, causes the network adapter to:
enqueue in a result queue a parser result coming from a parser, wherein the parser result indicates whether the parser result is complete or needs to be completed by a coprocessor result from the external coprocessor, wherein the network processor comprises a processor bus, at least one processor connected to the processor bus, and the network adapter connected to the processor bus and the external coprocessor;
enqueue in an additional queue an entry containing an address of the entry in the result queue and the indication that the parser result is complete or needs to be completed;
determine whether a first entry in the additional queue refers to a parser result to be completed; and
responsive to determining the first entry in the additional queue refers to a parser result to be completed and responsive to receiving a coprocessor result in a response register, merge the coprocessor result from the response register with a parser result read from the result queue using the address from the first entry in the additional queue to form a completed result, write the completed result in the result queue, and
expose the completed result to a dequeue and sequential sending process for further processing by the network processor.

14. The computer program product of claim 13, wherein the computer readable program further causes the network adapter to:
test whether a cyclical redundancy check (CRC) included in the coprocessor result is valid; and
responsive to the CRC not being valid, indicate in the corresponding entry in the result queue for upper layers of the network processor to discard the result.

15. The computer program product of claim 14, wherein the indicating in the corresponding entry in the result queue for upper layers of the network processor to discard the result comprises setting a discard bit of the entry.

16. The computer program product of claim 13, wherein the computer readable program further causes the network adapter to:
add to the additional queue entry a sequence number;
determine whether a response sequence number included in the coprocessor response is identical to a sequence number stored in the first entry of the additional queue; and
responsive to determining the response sequence number is not identical to the sequence number stored in the first entry of the additional queue, indicate in the corresponding entry in the result queue for the upper layers of the network processor to discard the result.

17. The computer program product of claim 16, wherein indicating in the result queue entry for the upper layers of the network processor to discard the result comprises setting a discard bit of the entry.

18. The computer program product of claim 13, wherein merging the coprocessor result with the parser result comprises reading in the coprocessor response a configuration to be applied to the merge operation and applying the configuration to multiplexors forming a bit-wise multiplex implemented merging logic.

* * * * *